UNITED STATES PATENT OFFICE.

JOHN WOODS BECKMAN, OF NIAGARA FALLS, NEW YORK.

METHOD OF PRODUCING SOLUBLE PHOSPHATES.

1,121,160.     Specification of Letters Patent.     Patented Dec. 15, 1914.

No Drawing.     Application filed April 30, 1913. Serial No. 764,612.

*To all whom it may concern:*

Be it known that I, JOHN WOODS BECKMAN, a subject of the King of Sweden, residing at Niagara Falls, in the county of Niagara and State of New York, have invented a new and useful Improvement in Methods of Producing Soluble Phosphates, of which the following is a full, clear, and exact description.

My invention has relation to a novel method for the production in a cheap and efficient manner of a new and valuable fertilizing material containing both potash and phosphoric acid, by the treatment of substances or materials at the present time available in the soil, but not directly suitable for fertilizing purposes.

I have discovered that, if salts having the general formula

are mixed with a mineral phosphate other than that of an alkali metal in such proportions that substantially chemically equivalent amounts of potash and phosphoric acid are present in the mixture and are then heated, a reaction takes place in which the potash enters into combination with the phosphoric acid of the phosphate and the metallic component of the phosphate takes the place of the potash in the original salt.

In this general formula $R_xO_y$ can be any metal oxid, the metal of which is more positive than S in $S_vO_z$. This salt need not be a potash salt, but may be a salt of any of the metals belonging to the alkali metal group, such as sodium, lithium, etc. I may also treat a mixture of such salts to obtain a product containing a mixture of the alkali metals present. The $S_vO_z$ in the above formula may be any metal oxid or an oxid compound of a metalloid, as for example, $SO_3$.

The mineral employed need not be pure, as impurities in no way interfere with the carrying out of the reaction. Thus, any available impure phosphate other than that of an alkali metal may be used.

One specific method of carrying out my invention may be described as follows: I take alunite, whose general formula is $3K_2O, 3Al_2O_3, 4SO_3, 6H_2O$ and mix the same with tricalcium phosphate in suitable proportions, which need not in all cases be limited to the chemical equivalents. I then heat the mixture in a suitable furnace to a red heat or above, the following reaction taking place:

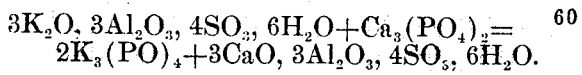

If the product is then mixed with water, the highly soluble potassium phosphate is dissolved out, and by evaporation can be obtained in a properly pure condition. In a similar manner, I can treat any of the many salts of this general character which are found in the soil.

I have found that for reasons which I do not as yet understand fully, the above stated reaction is often assisted by mixing with the original salts, materials which apparently do not directly partake in the reaction, such as coal, silica and other metal oxids. Chlorids of calcium and sodium also appear to have a beneficial effect on the reaction. The exact quantity of these additions can be best determined experimentally and the particular agent to be employed is determined largely by the particular character of the original salt being treated. In the treatment of alunite, I have obtained good results by the addition of $SiO_2$ to the amount of 1% of the calcium phosphate used.

The above described reaction gives a phosphate which is soluble in water and which is procured by leaching it out of the insoluble materials obtained in the reaction. It may occasionally be advantageous or desirable to produce a phosphate which is soluble in citric acid or in a mixture of citric acid and water, and this can be obtained by regulating the proportions of the original mixture, using only about one-half the chemical equivalent of the potash salt, but is only fit for application to the soil without prior leaching.

While I am not able to fully explain the above described reactions, as the heat of formation of many of the possible residual compounds after the soluble phosphate has been dissolved out is not known; it is nevertheless apparent that the thermal equation is in favor of carrying out the reaction. It is a well known fact that CaO is able to replace $K_2O$ in many of the complex potash salts present in the soil, especially if some or all of the Ca is combined in the shape of a salt with a strong negative component. The heat of formation of tricalcium phosphate is lower than the heat of formation of the corresponding potash salt.

My invention provides a simple and comparatively inexpensive method of producing a fertilizer which contains potash in a readily available form, as well as phosphoric acid, in a chemical combination which can be readily assimilated by growing plants and can be easily handled. The material being of comparatively high concentration, the cost of freight in handling is comparatively small.

I claim:

1. The herein described method of producing a soluble phosphate, which consists in heating a substance containing a non-volatile alkali metal salt having the general formula

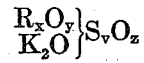

with a mineral phosphate other than that of an alkali metal, substantially as described.

2. The herein described method of producing a soluble phosphate which consists in heating alunite with tricalcium phosphate, substantially as described.

In testimony whereof, I have hereunto set my hand.

JOHN WOODS BECKMAN.

Witnesses:
SPENCER B. PARKER,
ALLEN STEWART.